May 20, 1947.     H. C. JENKS     2,420,881
REGULATING SYSTEM
Filed Sept. 20, 1944
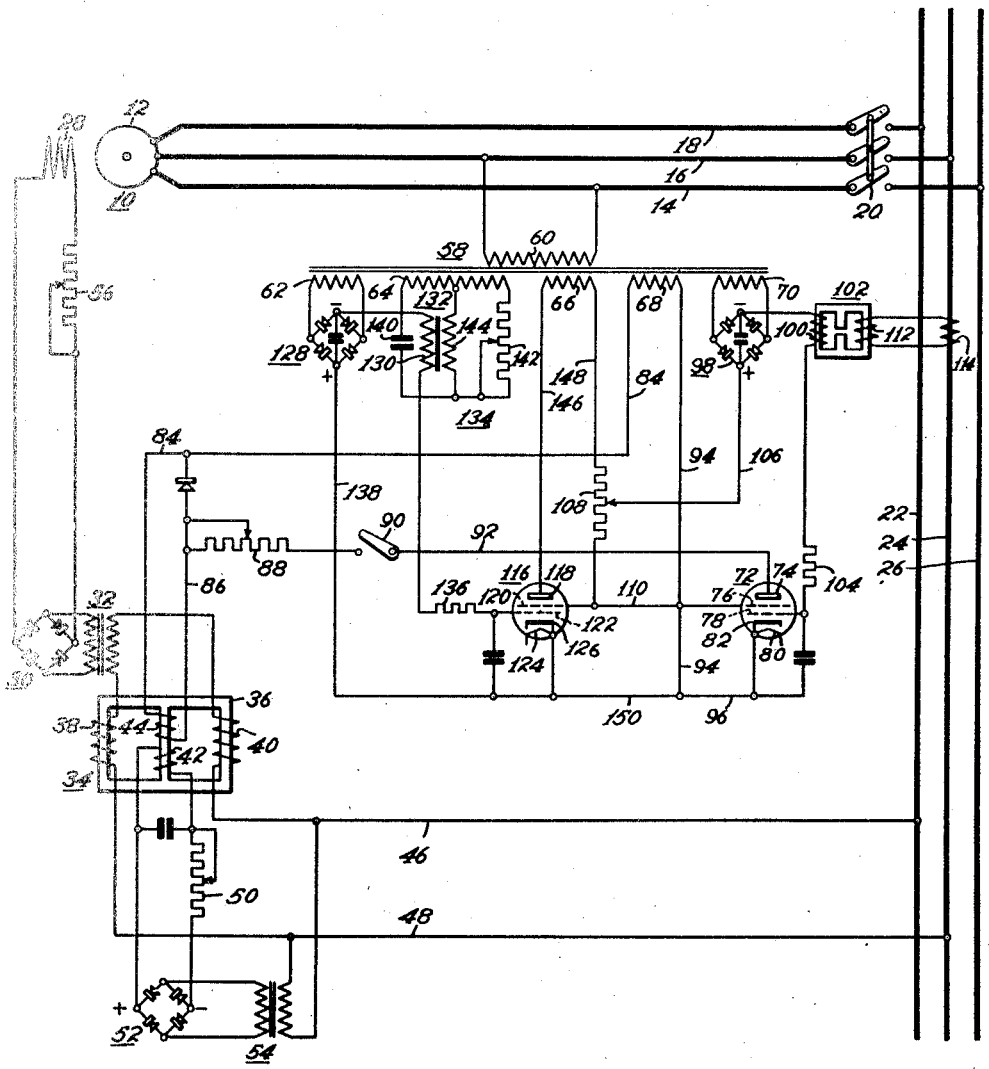
WITNESSES:
INVENTOR
Harold C. Jenks.
BY
ATTORNEY Patented May 20, 1947

2,420,881

UNITED STATES PATENT OFFICE 2,420,881

REGULATING SYSTEM

Harold C. Jenks, Cincinnati, Ohio, assignor to Westinghouse Electric Corporation, East Pittsburgh, Pa., a corporation of Pennsylvania Application September 20, 1944, Serial No. 554,910

8 Claims. (Cl. 172—246)

This invention relates to electrical systems and in particular to power factor regulating systems.

An object of this invention is to provide a regulating system responsive to fluctuations in power factor to maintain the power factor of a load system at substantially a predetermined value under no-load and load conditions.

Another object of this invention is to regulate the power factor of a synchronous motor by utilizing a saturable reactor for controlling the excitation thereof, the saturation of the reactor being controlled in response to the power factor drawn by the synchronous motor.

Other objects of this invention will become apparent from the following description when taken in conjunction with the accompanying drawing, the single figure of which is a diagrammatic view of the apparatus and circuits embodying the teachings of this invention.

Referring to the drawing, a synchronous motor 10 is illustrated as having its armature windings 12 connected by conductors 14, 16 and 18 through a three-pole switch 20 to load conductors 22, 24 and 26. The synchronous motor 10 is provided with field windings 28 which are connected through a rectifying bridge circuit 30, transformer 32 and saturable reactor 34 to the load conductors 22 and 24.

The saturable reactor 34 comprises the three-legged core member 36 having alternating current windings 38 and 40 carried on the outer legs thereof and two opposed direct-current windings 42 and 44 carried by the center leg thereof. The alternating current windings 38 and 40 are connected in series with the primary windings of transformer 32 therebetween and are disposed to be connected by conductors 46 and 48 to the conductors 22 and 24, respectively. By connecting the alternating-current windings 38 and 40 in this manner, all the flux flows in the outer legs of the core member 36 without passing through the center leg when the direct-current windings 42 and 44 are deenergized and consequently the alternating-current windings with the large amount of iron offer a high impedance to the load current of the reactor and little current flows through the primary windings of transformer 32.

The direct-current windings 42 of the reactor 34 are connected to be energized all the time that the alternating-current windings 38 and 40 are energized. Thus the windings 42 are connected through an adjustable resistor 50 across the output terminals of a rectifying bridge circuit 52, the input terminals of which are connected through the transformer 54 across conductors 46 and 48. By connecting the direct-current windings 42 in this manner, a flux will be created that tends to saturate the iron core member 36 decreasing the impedance of the alternating-current windings 38 and 40 to the alternating current so that more current flows through the primary windings of the transformer 32. By adjusting resistor 50 and a resistor 56 connected in the field circuit of the motor 10, the maximum value of excitation for the motor 10 can be determined for establishing the maximum permissible leading power factor to be drawn by the motor.

The other direct-current windings 44 of the reactor 34 are wound on the center leg of the core member 36 in opposition to the direct-current windings 42. As illustrated, the flow of current through the windings 44 is controlled in response to the power factor drawn by the synchronous motor 10 and consequently by the power factor of the load circuit. As a source of power for the windings 44, a transformer 58 having its primary windings 60 connected across conductors 14 and 18 is utilized. The transformer 58 is provided with a plurality of secondary windings 62, 64, 66, 68 and 70, the purpose of which will be explained more fully hereinafter.

In order to control the flow of current in the direct-current windings 44, the windings 44 are disposed to be connected through an electric valve discharge device 72 to the secondary windings 68 of the transformer 58. The electric valve 72 comprises an anode 74, a screen grid 76, a biasing grid 78, a heater 80 and a cathode 82. The electric valve 72 has the characteristics that when used on alternating current voltage, if rendered conducting by a grid impulse, it will conduct current for the remaining portion of the positive half cycle of the voltage wave but will be rendered non-conducting when the voltage decreases to the arc drop value of the valve and will not be reestablished during the negative half cycle of that voltage wave.

As illustrated, the secondary windings 68 of the transformer 58 for supplying current to the windings 44 have one of their terminals connected by conductor 84 to a terminal of the direct-current windings 44, the other terminal of which is connected by conductor 86 through an adjustable resistor 88, switch 90 and conductor 92 to the anode 74 of the valve 72. The other terminal of the secondary windings 68 is connected by conductors 94 and 96 to the cathode 82 of electric valve 72. The resistor 88 is included in the circuit just described in order to provide an adjustment for determining or limiting the maximum current flow in the windings 44 to determine the maximum energization of the windings 44 in opposition to that of the windings 42.

In order to provide a negative bias of the grid 78 of electric valve 72, the secondary windings 70 of the transformer 58 are connected across the input terminals of a rectifying bridge circuit 98, one of the output terminals of which is connected through the secondary windings 100 of an impulse transformer 102 and a resistor 104 to the grid 78, the other output terminal of the bridge circuit being connected by conductor 106 through a part of a resistor 108 and conductors 110, 94 and 96 to the cathode 82.

The impulse transformer 102 is provided for controlling the firing of the valve 72 in response to the phase angle of the load system. As illustrated, the primary windings 112 of the transformer 102 are connected to a current transformer 114 which is disposed in inductive relation with the load conductor 24. The impulse transformer 102 is of a type well known to industry, the leg of the magnetic core upon which the secondary windings 100 are wound being so designed that it will saturate very early in the current cycle and as a result of the rapid saturation will provide a peaked impulse of considerable magnitude. Thus, although the valve 72 is normally maintained nonconducting by the negative bias applied thereto when the impulse transformer 102 impresses its peaked voltage on the grid biasing circuit, the grid 78 is rendered less negative or more positive to cut the critical grid voltage of the valve 72 and render the valve conductive.

The phase position of the impulse impressed on the grid circuit by the impulse transformer 102 will be dependent upon the angle of the current being drawn by the synchronous motor. Thus at unity power factor the impulse comes at the peak of the positive half cycle of the voltage wave whereas for a leading power factor the impulse comes at an earlier time in the positive half cycle of the voltage wave and for a lagging power factor the impulse comes later in the positive half cycle of the voltage wave. Thus with the windings 44 connected across the anode 74 and the cathode 82 of electric valve 72, it is apparent that the current flow through the windings 44 is dependent upon the firing of the valve 72, the conductivity of which is controlled through the impulse transformer 102 in response to the power factor of the system.

As will be apparent if the synchronous motor 10 is pulling a leading power factor load as it would be if switch 20 were in the closed circuit position and switch 90 were in the open circuit position and resistors 50 and 56 were properly adjusted, then by closing switch 90 to connect the regulating system in circuit with the windings 44 of reactor 34, it will be seen that by reason of the impulse transformer 102 the valve 72 will fire early in the positive half cycle of the voltage wave to pass current through the direct-current windings 44. By thus energizing the windings 44 in opposition to the direct-current windings 42, the output of the reactor 34 is so changed as to reduce the excitation of the synchronous motor 10 and tend to force it to draw a lagging power factor.

In order to determine the power factor at which this forcing action of the direct-current windings 44 is limited and to provide a means for establishing or selecting the power factor at which the system will regulate, another electric valve 116 is disposed to control the bias of the grid 78 of the electric valve 72. The valve 116 is similar to the valve 72 having the same characteristics and being provided with an anode 118, a screen grid 120, a biasing grid 122, a heater 124 and a cathode 126.

As illustrated, the secondary windings 62 of transformer 58 are utilized for providing a negative bias on the grid 122, the windings 62 being connected across the input terminals of a rectifying bridge circuit 128, one of the output terminals of which is connected through the secondary windings 130 of grid transformer 132 in the grid shift network system or phase shifting circuit 134 and resistor 136 to the grid 122, the other output terminal of the bridge circuit 128 being connected by conductors 138 to the cathode 126.

The grid shift network 134 is supplied by the secondary windings 64 of the transformer 58, the secondary windings 64 being connected across the series connected capacitor 140 and adjustable resistor 142, the primary windings 144 of the grid transformer 132 being connected across the midpoint terminal of the secondary windings 64 and the junction of the capacitor 140 and resistor 142. By adjusting the number of sections of the resistor 142 connected in the grid shift network system an adjustment is made in the phase angle in which the valve 116 becomes conducting. This adjustment is independent of the power factor of the load drawn by the synchronous motor 10.

The anode 118 of the valve 116 is connected by conductor 146 to a terminal of the secondary windings 66 of transformer 58, the other terminal of the secondary windings 66 being connected by conductor 148 through resistor 108 and conductors 110, 94 and 150 to the cathode 126 of valve 116. Thus the output of valve 116 impresses a voltage on the grid biasing circuit of valve 72 by reason of the interconnected resistor 108 which is additive to the normal negative bias to definitely render the bias on grid 78 negative. This output is determined by the phase angle for which the grid shift network 134 is adjusted, such phase angle being independent of the power factor of the load drawn by the synchronous motor 10 as referred to hereinbefore.

Because of the characteristics of the valves 72 and 116, if valve 72 is rendered conductive by the action of the impulse transformer 102 in response to the power factor before valve 116 is rendered conducting, the valve 72 will remain conductive for the remaining portion of the positive half cycle of the voltage wave and the firing of the valve 116 will have no effect on the valve 72. However, if by reason of the phase angle adjustment of the network 134 or by reason of a change in the power factor of the load system tending toward a lagging power factor, the impulse from the impulse transformer 102 should come later in the voltage wave than the phase angle controlling the firing of valve 116 then the negative bias impressed on the grid circuit of valve 72 by reason of the valve 116 being rendered conductive is sufficient to maintain the valve 72 non-conducting whereby the direct-current windings 44 of the reactor 34 are maintained deenergized. Thus only the direct-current windings 42 are active in so controlling the saturation of the reactor 34 that the maximum permissible current flows through the primary windings of transformer 32 to affect the maximum permissible excitation of the synchronous motor 10 to cause it to draw a more leading power factor.

In operation, assuming that the resistors 50 and 56 have been adjusted to determine the excitation of the synchronous motor 10 for the maximum leading power factor which is to be permitted and that the resistor 88 is adjusted to determine the maximum current flow through direct-current windings 44 for determining the lagging power factor of the motor 10, if then the switches 20 and 90 are actuated to their circuit closing positions and the valves 72 and 116 are heated for operation, the synchronous motor 10 will draw a leading power factor.

Since the motor 10 draws a leading power factor, the impulse transfomer 102 functions to impress a peaked voltage on the grid-biasing circuit of valve 72 early in the positive half-cycle of the voltage wave to render the grid 78 less negative or more positive. When the grid 78 is biased in this manner, the valve 72 will conduct current through the circuit which extends from the anode 74 through conductor 92, switch 90, resistor 88, conductor 86, direct-current windings 44, conductor 84, secondary winding 68 of transformer 58 and conductors 94 and 96 to the cathode 82 of the valve 72. The direct-current flowing through the windings 44 creates a flux in the core of reactor 34 which is in opposition to the flux resulting from the current flowing through direct-current windings 42 to effect a reduction in the saturation of reactor 34 and thereby lower the flow of alternating-current through the primary windings of transformer 32. The resulting rectified current flowing through the field windings 28 of the synchronous motor 10 is thus so reduced that the synchronous motor tends to draw a more lagging power factor.

If the resistor 142 of the phase-shifting circuit 134 is adjusted to determine the phase angle at which it is desired to limit the power factor of the synchronous motor 10, then as the excitation of the motor 10 is reduced to force the motor to tend to draw a lagging power factor, as soon as the phase angle is reached that is established by the phase-shifting circuit 134, it is found that the valve 116 becomes conducting ahead of valve 72. When the valve 116 is conducting, current flows through the circuit extending from the anode 118 through conductor 146, secondary winding 66 of transformer 58, conductor 148, resistor 108, and conductors 110, 94 and 150 to the cathode 126 of valve 116. The flow of current through the resistor 108, which is interconnected in the output circuit of valve 116 and the grid-biasing circuit of valve 72, produces a potential across the part of resistor 108 in the grid-biasing circuit of valve 72 which is additive to the negative bias of the rectifying bridge circuit 98 to maintain the grid 78 negative regardless of the functioning thereafter of the impulse transformer 102 during that particular positive half-cycle of the voltage wave.

When the valve 72 is thus rendered non-conductive, the current flowing in the direct-current windings 42 tends to saturate the reactor 34 and thereby effect an increase in the alternating-current flowing in the primary windings of transformer 32. The resulting rectified current flowing through the field windings 28 of the synchronous motor 10 is thus so increased that the synchronous motor tends to draw a more leading power factor.

As soon as the power factor of the load system increases above the phase angle established by adjusting the resistor 142 of the grid-shifting circuit 134, the peaked impulse of transformer 102 is impressed upon the grid-biasing circuit of the valve 72 ahead of the negative bias impressed thereon by the valve 116 and the valve 72 thereby becomes conducting to again pass current to and through the direct-current windings 44 on the reactor 34. The output of the reactor 34 is thus again reduced to so effect a reduction in the excitation of the synchronous motor 10 that it tends to draw a more lagging power factor. It is thus evident that by adjusting resistor 142 of the phase-shift circuit 134, it is possible to select any predetermined power factor at which it is desired to have the synchronous motor 10 operate.

Although an anti-hunting circuit is not illustrated, it is apparent that any suitable circuit which imposes a potential on the grid biasing circuit of valve 72, such potential varying as the excitation of the synchronous motor 10 varies, may be utilized for controlling the bias of the valve 72 in anticipation of the change in excitation of the synchronous motor 10 to prevent an excessive overrun in the change in the excitation of the motor. Such anti-hunting circuits are well known and can be successfully incorporated in the system herein described.

The system described as embodying the teachings of this invention is composed of standard components such as require very little care and attention. Once the phase angle is determined at which it is desired to regulate and the phase-shifting circuit 134 is adjusted for such phase angle, the system requires no further maintenance. It will, of course, be understood that where it is desired to regulate for a different power factor that such regulation can be readily obtained by adjusting the phase-shift circuit to so control the saturation of the reactor as to maintain the excitation of the synchronous motor that it draws the selected power factor. Further, with the system of this invention there is no limit as to the size of the synchronous motor which is to be controlled as the reactor and cooperating rectifying bridge circuits can be made in accordance with the conditions which are to be encountered.

Although this invention has been described with reference to a particular embodiment thereof, it is, of course, not to be limited thereto except insofar as is necessitated by the scope of the appended claims.

I claim as my invention:

1. In a system for regulating the power factor of a synchronous motor connected to a load system, in combination, a saturable reactor connected to control the excitation of the synchronous motor, the saturable reactor having opposed direct-current control windings, one of the windings being disposed to be energized to effect saturation of the reactor to increase the excitation of the motor, the other of the windings functioning when energized to effect a decrease in the saturation of the reactor, means responsive to the power factor of the load system disposed to control the energization of the other winding, and means responsive to a fixed phase angle disposed to prevent the operation of the power factor responsive means to prevent the energization of the other winding under predetermined power factor conditions whereby the excitation of the synchronous motor is maintained within predetermined limits to regulate the power factor thereof.

2. In a system for regulating the power factor of a synchronous motor connected to a load system, in combination, a saturable reactor connected to control the excitation of the synchronous motor, the saturable reactor having opposed direct-current control windings, one of the windings being disposed to be energized to effect saturation of the reactor to increase the excitation of the motor, the other of the windings functioning when energized to effect a decrease in the saturation of the reactor, means responsive to the power factor of the load system disposed to control the energization of the other winding, and electric valve means responsive to a fixed phase angle disposed to prevent the operation of the power factor responsive means to prevent the energization of the other winding under predetermined power factor conditions whereby the excitation of the synchronous motor is maintained within predetermined limits to regulate the power factor thereof.

3. In a system for regulating the power factor of a synchronous motor connected to a load system, in combination, a saturable reactor connected to control the excitation of the synchronous motor, the saturable reactor having opposed direct-current control windings, one of the windings being disposed to be energized to effect saturation of the reactor to increase the excitation of the motor, the other of the windings functioning when energized to effect a decrease in the saturation of the reactor, means including an electric valve disposed to connect the other winding to a source of power, the electric valve having a grid to be utilized for controlling the conductivity thereof, a grid circuit responsive to the power factor of the load system for controlling the bias of the grid to control the energization of the other winding, and means cooperating in the grid circuit of the electric valve to maintain the valve non-conducting under predetermined power factor conditions.

4. In a system for regulating the power factor of a synchronous motor connected to a load system, in combination, a saturable reactor connected to control the excitation of the synchronous motor, the saturable reactor having opposed direct-current control windings, one of the windings being disposed to be energized to effect saturation of the reactor to increase the excitation of the motor, the other of the windings functioning when energized to effect a decrease in the saturation of the reactor, means including an electric valve disposed to connect the other winding to a source of power, the electric valve having a grid to be utilized for controlling the conductivity thereof, a grid circuit responsive to the power factor of the load system for controlling the bias of the grid to control the energization of the other winding, and means responsive to a predetermined phase angle disposed to cooperate in the grid circuit of the electric valve to maintain the valve non-conducting under predetermined power factor conditions.

5. In a system for regulating the power factor of a synchronous motor connected to a load system, in combination, a saturable reactor connected to control the excitation of the synchronous motor, the saturable reactor having opposed direct-current control windings, one of the windings being disposed to be energized to effect saturation of the reactor to increase the excitation of the motor, the other of the windings functioning when energized to effect a decrease in the saturation of the reactor, means including an electric valve disposed to connect the other winding to a source of power, the electric valve having a grid to be utilized for controlling the conductivity thereof, means for applying a negative bias to the grid, means for rendering the grid positive in response to the phase angle of the system to control the energization of the other winding, the positive biasing means including an impulse transformer connected to be responsive to the flow of current in the load system, and means responsive to a predetermined phase angle disposed to cooperate in the grid circuit of the electric valve to maintain the valve non-conducting under predetermined power factor conditions.

6. In a system for regulating the power factor of a synchronous motor connected to a load system, in combination, a saturable reactor connected to control the excitation of the synchronous motor, the saturable reactor machine having opposed direct-current control windings, one of the windings being disposed to be energized to effect saturation of the reactor to increase the excitation of the motor, the other of the windings functioning when energized to effect a decrease in the saturation of the reactor, a plurality of electric valves having grids for controlling the energization of the other winding, one of the valves being disposed to connect the other winding to a source of power, a grid circuit responsive to the power factor of the load system for controlling the bias of the grid of the one valve to render the one valve conducting, the other valve being connected to impress a negative bias on the grid of the one valve to render it non-conducting when the other valve is rendered conducting ahead of the one valve, the other valve having a grid biasing circuit responsive to a predetermined phase angle whereby the other valve cooperates with the grid biasing circuit of the one valve to maintain the one valve non-conducting under predetermined power factor conditions of the load system.

7. In a system for regulating the power factor of a synchronous motor connected to a load system, in combination, a saturable reactor connected to control the excitation of the synchronous motor, the saturable reactor having opposed windings, one of the windings being disposed to be energized to effect saturation of the reactor to increase the excitation of the motor, the other of the windings functioning when energized to effect a decrease in the saturation of the reactor, a plurality of electric valves having grids for controlling the energization of the other winding, one of the valves being disposed to connect the other winding to a source of power, a grid circuit responsive to the power factor of the load system for controlling the bias of the grid of the one valve to render the one valve conducting, the other valve having a grid biasing circuit responsive to a predetermined phase angle to render the other valve conducting, and means interconnecting the output of the other valve with the grid biasing circuit of the one valve whereby the other valve impresses a negative bias on the grid of the one valve to render it non-conducting when the other valve is rendered conducting ahead of the one valve.

8. In a system for regulating the power factor of a synchronous motor connected to a load system, in combination, a saturable reactor connected to control the excitation of the synchronous motor, the saturable reactor having opposed direct-current control windings, one of the windings being disposed to be energized to effect saturation of the reactor to increase the excitation of the motor, the other of the windings functioning when energized to effect a decrease in the saturation of the reactor, a plurality of electric valves having grids for controlling the energization of the other winding, one of the valves being disposed to connect the other winding to a source of power, a grid circuit responsive to the power factor of the load system for controlling the bias of the grid of the one valve to render the one valve conducting, means for applying a negative bias on the grid of the other valve, a grid shift network system disposed to impress a positive bias on the grid of the other valve at a predetermined phase angle to render the other valve conducting, and means interconnecting the output of the other valve with the grid biasing circuit of the one valve whereby the other valve impresses a negative bias on the grid of the one valve to render it non-conducting when the other valve is rendered conducting ahead of the one valve.

HAROLD C. JENKS.

REFERENCES CITED

The following references are of record in the file of this patent:

UNITED STATES PATENTS

| Number | Name | Date |
| --- | --- | --- |
| 1,710,755 | West | Apr. 30, 1929 |